R. H. SPRINGSTEED.
Seed Planter.
No. 3,901.
Patented Feb. 12, 1845.
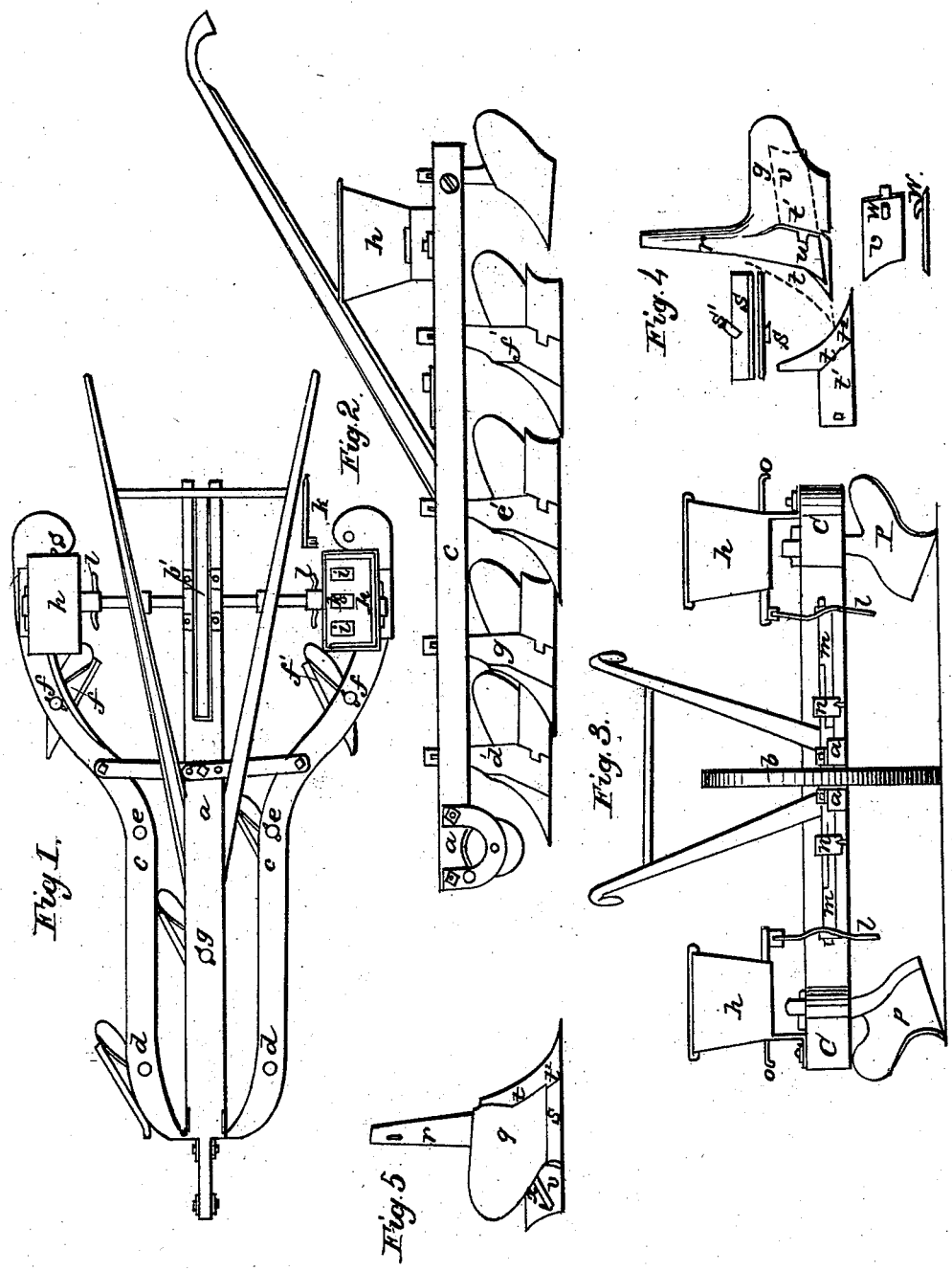

UNITED STATES PATENT OFFICE.

R. H. SPRINGSTEED, OF WOOSTER, OHIO.

IMPROVEMENT IN CULTIVATORS AND SEED-PLANTERS.

Specification forming part of Letters Patent No. 3,901, dated February 12, 1844.

*To all whom it may concern:*

Be it known that I, R. H. SPRINGSTEED, of Wooster, in the county of Wayne and State of Ohio, have invented a new and useful Improvement in combined Cultivator and Seed-Planter; and I do hereby declare that the following is a full, clear, and exact description thereof, reference being had to the following drawings, in which—

Figure 1 is a top plan. Fig. 2 is a side elevation. Fig. 3 is a view of the machine, seen from behind. Fig. 4 is a detached plow, with the parts separated; Fig. 5, the mold-board side of the plow.

The nature of my invention consists in so constructing the frame and arranging the plows therein as to form a diagonal row, as shown in the drawings, the frame being jointed so as to expand or contract at pleasure, and in combination therewith the hoppers for seed worked by cams, the shafts of which are so constructed as to be lengthened or contracted without extending beyond the sides of the frame.

The construction is as follows:

The frame is composed of a straight beam, $a$, running through the center horizontally. To this piece the handles are fastened, made like common plow-handles, and in the hinder end of said beam there is a long slot for a wheel, $b$, to work in, that runs on the ground for a purpose to be described. Two side beams, $c$, are connected with the center one, $a$, one on each side, by a joint or hinge at their forward ends. These beams $c$ curve slightly from the joint, and then run nearly parallel with the center beam till they reach nearly the center of said beam, when they curve outward in an ogee form, as is clearly shown in Fig. 1, terminating at the rear end by a slight curve inward.

A round hole is made in each of the beams $c$ at $d$, just behind the joint, and a second one, $e$, at a point directly before the beam begins to curve outward. A third hole, $f$, is made at a point where the beam $c$ on one side crosses a straight line drawn from the center of the first hole, $d$, on the opposite beam through the second hole, $e$, on the beam where the third hole is to be made, as shown on the drawings. These holes are made to fit plows into, and an additional one, $g$, to those already mentioned is made in the center beam where the line above named crosses it. By this construction a series of four plows can be connected for turning furrows to the left, as shown in the drawings, or to the right by inserting plows of that description (one of which is shown at Fig. 1, $f'$) in the other line of holes in the opposite beam. By leaving out the plows $d'$ and $e'$ a corn-cultivator is produced, and then by adding a hopper, $h$, on each of the beams $c$, just behind the plows $f'$, a seed-planter can be produced.

The bottom of the hoppers (one of which is shown on the drawings, by removing the cover) have three recesses, $i$, formed in them, in which slide straight pieces $k$, one of which only is represented in place in the drawings; another is shown detached. These project out through the side of the hopper on the inside and are connected with a cam, $l$, on the end of a shaft, $m$, on which is the wheel $b'$, above named, said shaft having its bearings in the center beam, $a$. The two ends of the shaft are halved onto the center part and are fastened by means of a collar, $n$, and set-screw, so that the shaft can be lengthened at pleasure. This is most clearly represented in Fig. 3.

In front of the shaft and wheel $b$ are two bars attached to the side beams, $c$, and connect them to the center beam at any required distance apart, so that the implement can be adjusted to any width of furrow, &c., and the dropping apparatus can likewise be extended or contracted without having the shaft on which are the cams extend beyond the side of the frame and incur the risk of injury, as is the case when they do so extend. The cams are for the purpose of giving the slides $k$ a reciprocating motion, and the slides have a hole through them and convey the seed in the usual way. For dropping in hills one slide only is used, but for drilling all three are operated. A slide, $o$, Fig. 3, is shut when the dropping is to cease, which covers the slides. Behind the hoppers coverers $p$ are placed, that are shaped something like the mold-board of a plow, and cover the seed lightly. The construction of my plows for this machine is as follows:

The mold-board $q$, Fig. 4, and standard $r$ are in one piece. To the lower edge of the mold-board a share, $s$, is fitted, on the inside of which is a little projection, $s'$, that fits into a notch that is cut into the mold-board, slanting backward. The cutter, (shown detached at $t$, Fig. 4) has a broad tongue, $t'$, extending back from it along inside and parallel with the landside when in place, as shown by dotted lines in Fig. 4, the end extending beyond the end of the standard $u$, that projects down and forms a part of the landside, and a hole being made in $t'$ at that point a projection, $t^2$, on the back of the cutter comes against the share $s$ and prevents its unfastening from its place, which it cannot do without moving forward, as will be obvious on an inspection of the drawings. The rear end of the landside $v$ has a hook, $w$, on its inside that hooks into the hole in the tongue of the cutter. When this part of the landside is hooked in the rear end is kept out by a brace, $x$, that extends from it to the mold-board, and thus secures the whole together.

Having thus fully described my improvement, I wish it to be understood that I do not claim a cultivator with the side beams of the frame movable, nor do I claim the spreading or contracting seed-planters, or the extension of shafts, as described in my machine, as it has been before used for various purposes; but

What I do claim as my invention, and desire to secure by Letters Patent, is—

1. The arrangement of the plows, as herein described, by means of the curved side pieces of the frame, said side pieces being made so that they can be expanded, for the purposes herein set forth.

2. In combination with the above, the shaft $m$, constructed so as to extend, as herein described, combined with and operating the slides in the hoppers.

3. The construction of the lock of the plow, as herein described, so as to fasten all of the parts by hooking the landside into the cutter, as described.

R. H. SPRINGSTEED.

Witnesses:
   J. J. GREENOUGH,
   LAFAYETTE CALDWELL.